Dec. 31, 1963     H. M. POLLAK ETAL     3,115,839
ELECTRIC MOTOR DRIVEN PUMP
Filed Dec. 9, 1960     2 Sheets-Sheet 1

INVENTORS
HENRY M. POLLAK
THOMAS J. HEFLER
THEIR ATTORNEY

INVENTORS
HENRY M. POLLAK
THOMAS J. HEFLER
BY
THEIR ATTORNEY

3,115,839
ELECTRIC MOTOR DRIVEN PUMP

Henry M. Pollak and Thomas J. Hefler, Easton, Pa., assignors to Ingersoll-Rand Company, New York, N.Y., a corporation of New Jersey
Filed Dec. 9, 1960, Ser. No. 74,816
7 Claims. (Cl. 103—87)

This invention relates to liquid pumps, and more particularly to a liquid pump electrically driven and completely inclosed to prevent leakage.

The pump of this invention is particularly applicable to pumping non-electrolytic fluids with an electric motor running in the pumped fluid and with circulation of such fluid for the purpose of cooling the motor and lubricating bearings thereof. Such a motor and pump arrangement is particularly useful as a circulating means for transformers using oil as a cooling medium. Such transformers are usually not attended and since the circulating pump runs constantly it is most desirable that the unit be free from leakage and reliable over long periods.

It is accordingly an object of this invention to provide a construction or pump of this character which will be trouble free, adequately cooled and lubricated and perfectly sealed from leakage.

It is a further object of the invention to provide an electric motor driven pump permitting easy disassembly of all the parts from the pump casing as a unit.

This invention contemplates an electric motor driven pump having a housing with inlet and discharge passages for an impeller rotatable therein, a shell partially disposed in and sealingly connected to the housing, an electric motor in the shell having a shaft extending into the housing on which the impeller is mounted for rotation by such motor, the shell and housing forming passage means therebetween encircling the motor and leading from the discharge passage into the shell to provide liquid thereto, and the shell having flow path means therethrough adjacent the impeller for the return of liquid to the housing.

The foregoing and other objects and advantages will appear more fully hereinafter from a consideration of the detailed description which follows, taken together with the accompanying drawings wherein one embodiment of the invention is illustrated by way of example. It is expressly understood, however, that the drawings are for illustration purposes only and are not to be construed as defining the limits of the invention.

Figure 1:
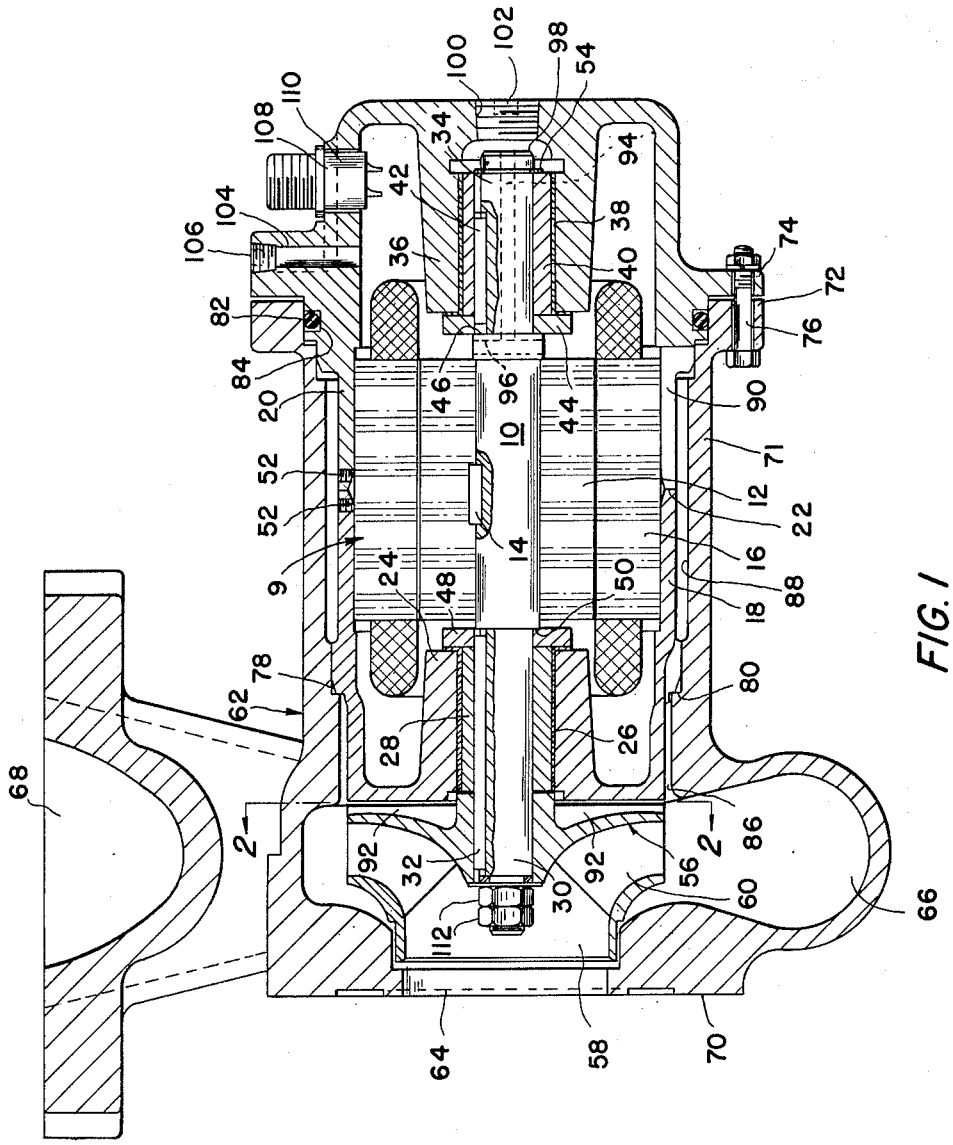
Figure 2:
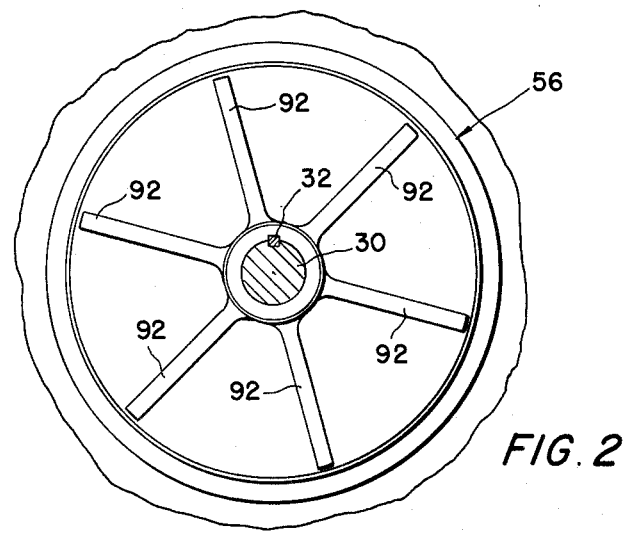

FIGURE 1, a longitudinal section of the pump with respect to the central axis,

FIG. 2, a back face view of the pump impeller removed from the assembly, and

Figure 3:
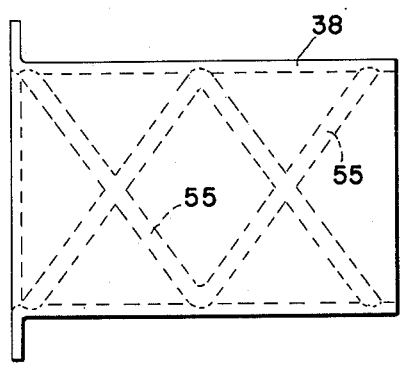

FIG. 3, a longitudinal section of one of the shaft bearings.

Referring now to the drawings, a drive motor 9 of a pump assembly includes, in accordance with the invention, a rotor 12 mounted on and secured to a drive shaft 10 by any suitable means such as a press fit or a key 14, and a stator 16, preferably having a cylindrical outer periphery, that encircles the rotor 12. The motor 9 is housed in a shell comprising an inner section 18 and an outer section 20 which, in this instance, abut each other at their ends, as indicated at 22, and fit snugly about stator 16. The inner section 18 has a bearing support cylindrically bored flange 24 within which is fitted a flanged bearing 26 for a sleeve 28 mounted on one end 30 of the shaft 10 which, as indicated, protrudes or extends through shell section 18; the sleeve 28 being secured to shaft end 30, within the limits of shell section 18, by a suitable key 32.

The outer section 20 of the shell encloses the opposite end 34 of shaft 10 and has a similar bearing support 36 within which is mounted a shaft bearing 38, in all respects, similar to bearing 26. A sleeve 40, like sleeve 28, rides in bearing 38 and is suitably mounted on the shaft end 34 by a key 42. A thrust ring 44 is fitted on shaft end 34 against a shoulder 46, and forms a thrust bearing cooperating with the flange of bearing 38 to prevent endwise movement, in one direction, of shaft 10. A similar thrust ring 48 is fitted on shaft end 30 against a shoulder 50 and forms a thrust bearing cooperating with the flange of bearing 26 to prevent endwise movement, in the other direction, of shaft 10. To hold sections 18 and 20 of the shell together and on stator 16, set screws 52 are provided near the ends of the sections to grip the stator 16 firmly. To hold sleeve 40 on shaft end 34, a keeper ring 54 is provided.

As previously stated, the construction of bearing 26 is the same as bearing 38 which, as an example is shown in FIG. 3, is provided with spiral grooves 55 to permit lubricant fluid to pass from one end of the bearing to the other relatively freely. The bearing, either 26 or 38, itself is composed of suitable bearing metal, as for instance babbitt, and has the general characteristics of all well constructed bearings.

An impeller 56 is mounted on the end 30 of shaft 10, which projects beyond the end of shell section 18, within a housing 62 that has an eye 58, and spirally arranged blades 60 to impart centrifugal force to liquid passing from eye 58 to the periphery of the impeller 56, whereby discharge pressure is developed. Impeller 56 is rotated by the motor 9 within housing 62 having an inlet passage 64 to provide liquid to eye 58 and a discharge passage 66 preferably in the form of a volute terminating at a flanged opening 68 for attachment to a suitable conduit (not shown). Likewise, inlet passage 64 has a machined surface 70 for attachment to a supply conduit (not shown). Housing 62 has an outwardly extending cylindrical portion 71 through which impeller 56, mounted on shaft 10, is inserted and into which shell sections 18 and 20, containing the motor 9, are slipped at least in part and held sealingly and rigidly therein.

To this end, cylindrical portion 71 of housing 62 has a flange 72 cooperating with a complementary flange 74 on shell section 20 to receive clamping bolts 76. Housing 62 also has a shoulder 78 engaged by a shoulder 80 on shell section 18 to rigidly hold the shell relative to housing 62. Sealing therebetween against external leakage is accomplished by an O-ring 82 disposed in a suitable groove 84 in shell section 20 and cooperating with the inner face of flange 72.

Means is provided to introduce liquid from the discharge passage 66 into the interior of the shell or shell sections 18 and 20. For this purpose, a passage is provided in housing 62 formed by annular clearances between the inner wall of the cylindrical portion 71 and the shell section 18, one of the clearances extending inwardly from the shoulder 80 to provide an entrance 86 at discharge passage 66, and the other of the clearances extending outwardly from shoulder 80 to provide an annular chamber 88. Shoulder 80 and/or 78 is cut away, in part, to connect entrance 86 to chamber 88 which is, in turn, connected by slots 90 cut in the wall of shell section 20 to the interior of section 20 outward of stator 16 or adjacent the end of the motor remote from the impeller. It will thus be seen that shell sections 18 and 20 are surrounded by liquid in chamber 88 introduced from discharge passage 66. Such liquid can and does pass from the interior of shell section 20, through the space between rotor 12 and stator 16 of motor 9, to the interior of shell section 18 whence it will be drawn through the flow path formed by grooves 55 cut in bearing 26 back into the space behind impeller 56. To produce suction for withdrawing liquid thus passing by bearing 26, impeller 56 is provided with vanes 92, as shown in FIG. 2, on its back face. Thus the liquid is caused to circulate by the suction produced thereby and a substantial circulation is thus established through the interior of the shell enclosing the motor parts.

Additional means is provided to cool and lubricate bearing 38 and for this purpose shaft end 34 is hollow, having a bore 94 extending from its outer end to transverse passages 96 extending radially to the interior of shell section 20. Bore 94 communicates with a chamber 98 completely enclosed at the head end of shell section 20. It will thus be seen that suction will be produced in chamber 98 by the centrifugal action in the radial passages 96 tending to throw liquid outwardly from shaft 10, thus, drawing liquid through bore 94. Such suction reflected in chamber 98 will draw liquid from the interior of shell section 20, past thrust ring 44, and by way of grooves 55 in bearing 38, to effect lubricating the bearing, and cooling as well.

To provide access to the shaft end 34, a tapped hole 100 is provided, normally closed by a plug 102. Likewise, access to the interior of the shell is provided by a bore 104 normally closed by a plug 106. This provides means for insertion of suitable thermometers, pressure indicating devices and the like (not shown), if required.

Suitable electrical connections may be made with the motor 9. The electrical leads used for such connections are not here shown as they would tend to complicate the drawing unnecessarily. They are, however, introduced by way of a suitable electrical connector 108 disposed in an aperture 110 in the wall of shell section 20.

It will thus be seen that dismantling of the pump for purposes of repair or geneal inspection is easily accomplished by merely removing the bolts 76 and withdrawing shell sections 18 and 20, housing the motor 9 and pump impeller 56 as a unit from housing 62 without disturbing the main liquid circulation connections of the pump. The seals thus broken are easily restored by a new O-ring 82. Likewise, removal of the nuts 112 holding impeller 56 on the end 30 of shaft 10, permits easy removal of the impeller, thereafter loosening of set screws 52 releases the sections 18 and 20 of the shell from the stator 16. Shaft 10 is readily withdrawn from its bearings 26 and 38 which constitutes a substantially complete dismantling of the pump unit.

Thus, by the above construction are accomplished, among others, the objects hereinbefore referred to.

We claim:

1. An electric motor driven pump comprising a housing having liquid inlet and discharge passages, an impeller in the housing rotatably driven to draw liquid through the inlet and to impel the liquid to the discharge passage, a shell at least partially disposed in the housing and sealingly connected thereto, an electric motor enclosed in the shell having a rotor to drive the impeller and a stator encircling the rotor, a motor shaft extending through the shell and connecting the rotor to the impeller, the housing and shell forming passage means therebetween for the liquid extending around the motor and leading from the discharge passage into the shell adjacent the end of the motor remote from the impeller, said shell having flow path means therethrough adjacent the impeller, and the impeller having vanes adjacent the shell producing pressure when the impeller rotates to return the liquid through the motor between the rotor and stator and through the flow path means to the discharge passage.

2. An electric motor driven pump comprising a housing having liquid inlet and discharge passages, an impeller in the housing rotatably driven to draw liquid through the inlet and to impel the liquid to the discharge passage, a shell at least partially disposed in the housing and sealingly connected thereto, an electric motor enclosed in the shell having a rotor to drive the impeller and a stator encircling the rotor, a motor shaft extending through the shell and connecting the rotor to the impeller, the housing and shell providing an annular chamber therebetween encircling the motor and passage means for the liquid from the discharge passage to the annular chamber, the shell having slot means adjacent the end of the motor remote from the impeller for discharging the liquid from the annular chamber into the shell and flow path means therethrough adjacent the impeller, and the impeller having vanes adjacent the shell producing pressure when the impeller rotates to return the liquid through the motor between the rotor and stator and through the flow path means to the discharge passage.

3. An electric motor driven pump comprising a housing having liquid inlet and discharge passages, an impeller in the housing rotatably driven to draw liquid through the inlet and to impel the liquid to the discharge passage, a shell at least partially disposed in the housing and sealingly connected thereto, an electric motor enclosed in the shell having a rotor to drive the impeller and a stator encircling the rotor, the shell having a bearing support in each end, a bearing in each support, a motor shaft rotatably mounted in the bearings that extends through the shell and connects the rotor to the impeller, each bearing having means for providing a flow path for the liquid between the bearing and shaft, the housing and shell providing an annular chamber therebetween encircling the motor and passage means for the liquid from the discharge passage to the annular chamber, the shell having slot means adjacent the end of the motor remote from the impeller for discharging the liquid from the annular chamber into the shell, and the impeller having vanes adjacent the shell producing pressure when the impeller rotates to return the liquid through the motor between the rotor and stator and through the flow path provided by the bearing adjacent the impeller to the discharge passage.

4. An electric motor driven pump comprising a housing having liquid inlet and discharge passages, an impeller in the housing rotatably driven to draw liquid through the inlet and to impel the liquid to the discharge passage, a pair of shell sections in end to end abutment, one shell section being disposed in the housing, the other shell section being at least partially disposed in the housing and being sealingly connected thereto, an electric motor enclosed in the pair of shell sections having a rotor to drive the impeller and a stator encircling the rotor, means for connecting the pair of shell sections to the stator, a motor shaft extending through the one shell section in the housing and connecting the rotor to the impeller, the housing and at least one of the shell sections forming passage means therebetween for the liquid extending around the motor and leading from the discharge passage into the shell sections, and one of the shell sections having flow path means therethrough adjacent the impeller for return of the liquid through the motor to the discharge passage.

5. An electric motor driven pump comprising a housing having liquid inlet and discharge passages, an impeller in the housing rotatably driven to draw liquid through the inlet and to impel the liquid to the discharge passage, a pair of shell sections in end to end abutment, one shell section being disposed in the housing and having flow path means therethrough adjacent the impeller, the other shell section being at least partially disposed in the housing and being sealingly connected thereto, an electric motor enclosed in the pair of shell sections having a rotor to drive the impeller and a stator encircling the rotor, means for connecting the pair of shell sections to the stator, a motor shaft extending through the one shell section in the housing and connecting the rotor to the impeller, the housing with the pair of shell sections providing an annular chamber encircling the motor and with the one shell section disposed therein providing passage means for the liquid from the discharge passage to the annular chamber, at least one of the shell sections having slot means adjacent the end of the motor remote from the impeller through which the liquid in the annular chamber enters the shell, and the impeller having pressure producing means to return the liquid through the motor and flow path means to the discharge passage.

6. An electric motor driven pump comprising a housing having liquid inlet and discharge passages, an impeller in the housing rotatably driven to draw liquid through the inlet and to impel the liquid to the discharge passage, a pair of shell sections in end to end abutment, one shell section being disposed in the housing and having flow path means therethrough adjacent the impeller, the other shell section being at least partially disposed in the housing and being sealingly connected thereto, an electric motor enclosed in the pair of shell sections having a rotor to drive the impeller and a stator encircling the rotor, means for connecting the pair of shell sections to the stator, a motor shaft extending through the one shell section in the housing and connecting the rotor to the impeller, the housing with the pair of shell sections providing an annular chamber encircling the motor and with the one shell section disposed therein providing passage means for the liquid from the discharge passage to the annular chamber, the other of the shell sections having slot means adjacent the end of the motor remote from the impeller through which the liquid in the annular chamber enters the shell sections, and the impeller having vanes adjacent the one shell in the housing for producing pressure when the impeller rotates to return the liquid through the motor between the rotor and stator and through the flow path means to the discharge passage.

7. An electric motor driven pump comprising a housing having liquid inlet and discharge passages, an impeller in the housing rotatably driven to draw liquid through the inlet and to impel the liquid to the discharge passage, a pair of shell sections in end to end abutment and each having a bearing support at its end remote from its abutting end, a bearing in each support, one shell section being disposed in the housing, the other shell section being at least partially disposed in the housing and being sealingly connected thereto, an electric motor enclosed in the pair of shell sections having a rotor to drive the impeller and a stator encircling the rotor, means for connecting the pair of shell sections to the stator, a motor shaft rotatably mounted in the bearings that extends through the one shell section in the housing and connects the rotor to the impeller, each bearing having means for providing a flow path for the liquid between the bearing and shaft, the housing with the pair of shell sections providing an annular chamber encircling the motor and with the one shell section disposed therein providing passage means for the liquid from the discharge passage to the annular chamber, the other of the shell sections having slot means adjacent the end of the motor remote from the impeller through which the liquid in the annular chamber enters the shell sections, and the impeller having vanes adjacent the shell sections producing pressure when the impeller rotates to return the liquid through the motor between the rotor and stator and through the flow path provided by the bearing adjacent the impeller to the discharge passage.

References Cited in the file of this patent

UNITED STATES PATENTS

| | | |
|---|---|---|
| 1,967,316 | Meeker | July 24, 1934 |
| 2,190,246 | Schirmer | Feb. 13, 1940 |
| 2,384,254 | Meredew | Sept. 4, 1945 |
| 2,520,880 | Harlamoff | Aug. 29, 1950 |
| 2,854,594 | Philippovic | Sept. 30, 1958 |
| 2,915,978 | Schaefer | Dec. 8, 1959 |

FOREIGN PATENTS

| | | |
|---|---|---|
| 573,285 | Italy | Feb. 20, 1958 |